(No Model.)

B. L. HODGDON.
HARROW AND PULVERIZER.

No. 253,384. Patented Feb. 7, 1882.

Witness
John R. Mason
Arthur M. Mason

Inventor
Bemus L. Hogdon
By Wm Franklin Seavey
Atty

UNITED STATES PATENT OFFICE.

BEMUS L. HODGDON, OF LEVANT, MAINE.

HARROW AND PULVERIZER.

SPECIFICATION forming part of Letters Patent No. 253,384, dated February 7, 1882.

Application filed September 17, 1881. (No model.)

*To all whom it may concern:*

Be it known that I, BEMUS L. HODGDON, of Levant, in the county of Penobscot and State of Maine, have invented certain new and useful Improvements in Harrows and Pulverizers; and I do hereby declare that the following is a full, clear, and exact description of the invention, that will enable others skilled in the art to which it appertains to make and use the same, reference being had to the accompanying drawings, forming a part of this specification, in which—

Figure 2:
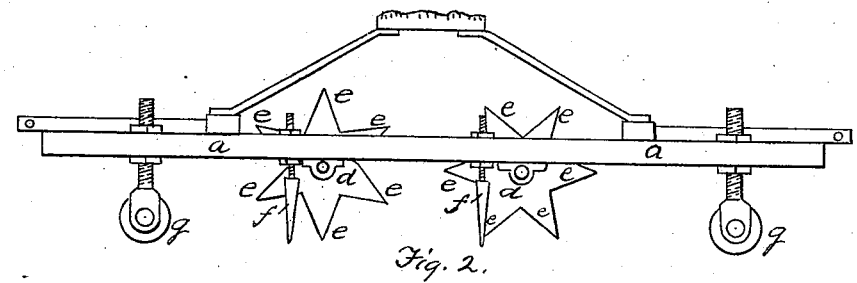
Figure 1:
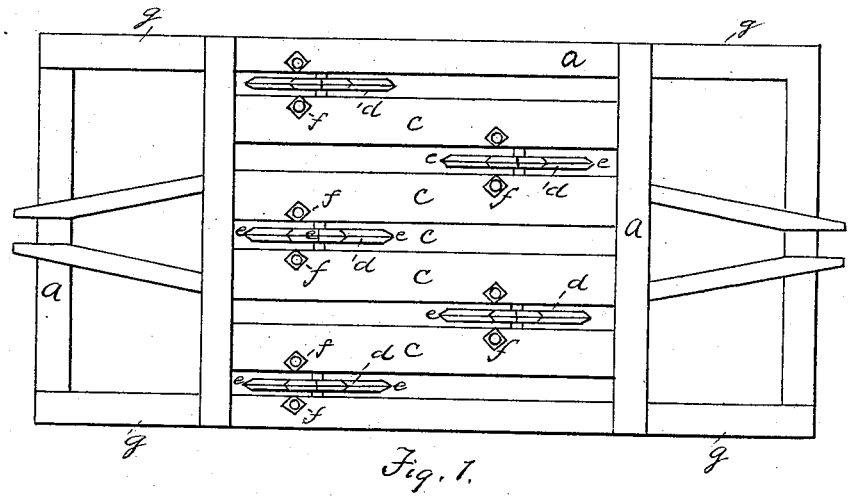

Figure 1 shows a plan; Fig. 2, a side elevation.

Same letters show like parts.

My invention consists of an improvement in harrows and pulverizers, and will be readily understood by reference to the accompanying drawings, in which, at $a$, is shown a suitable frame provided with devices for attaching the usual pole or shafts at either end. Timbers $c$ cross the frame longitudinally, arranged with a sufficient space between them for the reception of wheels $d$, journaled thereto. These wheels are not round, as usual, but are star-shaped, having five or more points, $e$ $e$, and revolve between teeth $f$, placed near their sides and slightly in advance of the axles. These teeth are so arranged in the frame as to be vertically adjustable. When the motion of the harrow is in the direction of the arrow the points $e$ of the wheels enter the sod or clod of earth just in advance of the teeth, holding in firmly, while the forward motion of the teeth tear it asunder. This, as will be readily seen, is of great service in deep harrowing.

To use the machine as a pulverizer the pole is secured to the opposite end. The points of the wheels then enter the ground so far in advance of the teeth that they are removed before the tooth reaches the place, serving to perforate and soften the ground, while the teeth following pulverize the surface.

At $g$ $g$, on each side of the frame, are placed vertically-adjustable supporting-rollers by which the depth of penetration of the harrow may be regulated, or, if necessary, the harrowing devices raised entirely from the ground.

The machine being as described, reversible, for the purposes of deep-soil harrowing and of pulverizing, the seat may be either constructed to revolve or capable of use for driving in either direction.

The adjusting devices shown for the teeth and roller-wheels consist of screw-shanks, with a nut above and below the frame; but I do not desire to limit myself to these.

I do not claim broadly a star-shaped or toothed wheel, as I am aware that such have been used before; but my combination embraces such a wheel revolving between stationary teeth, and acting in conjunction with them. This I believe to be novel.

What I claim as my invention is—

1. In a harrow, the combination of the star-shaped wheels $d$ $d$, and vertically-adjustable stationary teeth $f$, placed on each side of said wheels and co-operating with them, substantially in the manner described.

2. The reversible harrow and pulverizer, having the star-shaped wheels $d$, adjustable teeth $f$, and adjustable rollers $g$ $g$, operating as a deep-soil harrow when drawn in one direction, and as a surface-pulverizer when said direction is reversed, substantially as set forth.

In testimony that I claim the foregoing I have hereunto set my hand this 14th day of September, 1881.

BEMUS L. HODGDON.

Witnesses:
F. H. C. REYNOLDS,
WM. FRANKLIN SEAVEY.